United States Patent [19]

Junker

[11] Patent Number: 4,854,364

[45] Date of Patent: Aug. 8, 1989

[54] PET BARRIER FOR CAR WINDOW INSTALLATION

[76] Inventor: Belva J. Junker, 2150 Laura Space 68, Springfield, Oreg. 97477

[21] Appl. No.: 147,290

[22] Filed: Jan. 22, 1988

[51] Int. Cl.$^4$ .............................................. E06B 3/32
[52] U.S. Cl. ..................................... 160/105; 296/152
[58] Field of Search ......... 160/104, 105, 223, DIG. 2, 160/351, 216; 296/24 R, 24 C, 84 M

[56] References Cited

U.S. PATENT DOCUMENTS

| Re. 17,911 | 12/1930 | Rexinger | 160/223 X |
| 958,481 | 5/1910 | Drinkwater | 160/104 |
| 1,734,415 | 11/1929 | Bierfield | 160/105 |
| 2,405,535 | 8/1946 | Weiss | 160/223 X |
| 2,803,471 | 8/1957 | Roth | 160/105 X |
| 2,982,579 | 5/1961 | Greenwald | 160/223 X |
| 3,083,630 | 4/1963 | Thaxton | 98/2 |
| 3,204,981 | 9/1965 | Edwards | 160/105 X |
| 3,743,001 | 7/1973 | Baxter et al. | 160/105 |
| 4,653,562 | 3/1987 | Moss et al. | 160/105 |

Primary Examiner—Blair M. Johnson
Attorney, Agent, or Firm—James D. Givinan, Jr.

[57] ABSTRACT

A barrier having vertically spaced tubular members each having telescopic extensions and locking screws to lock the extensions in abutment with vehicle structure defining a window opening. Posts include spring biased post segments which bias the top and bottom of the barrier into window and window channel engagement. The post ends are bifurcated and tapered to assure retentive engagement with the window and window channel.

4 Claims, 1 Drawing Sheet

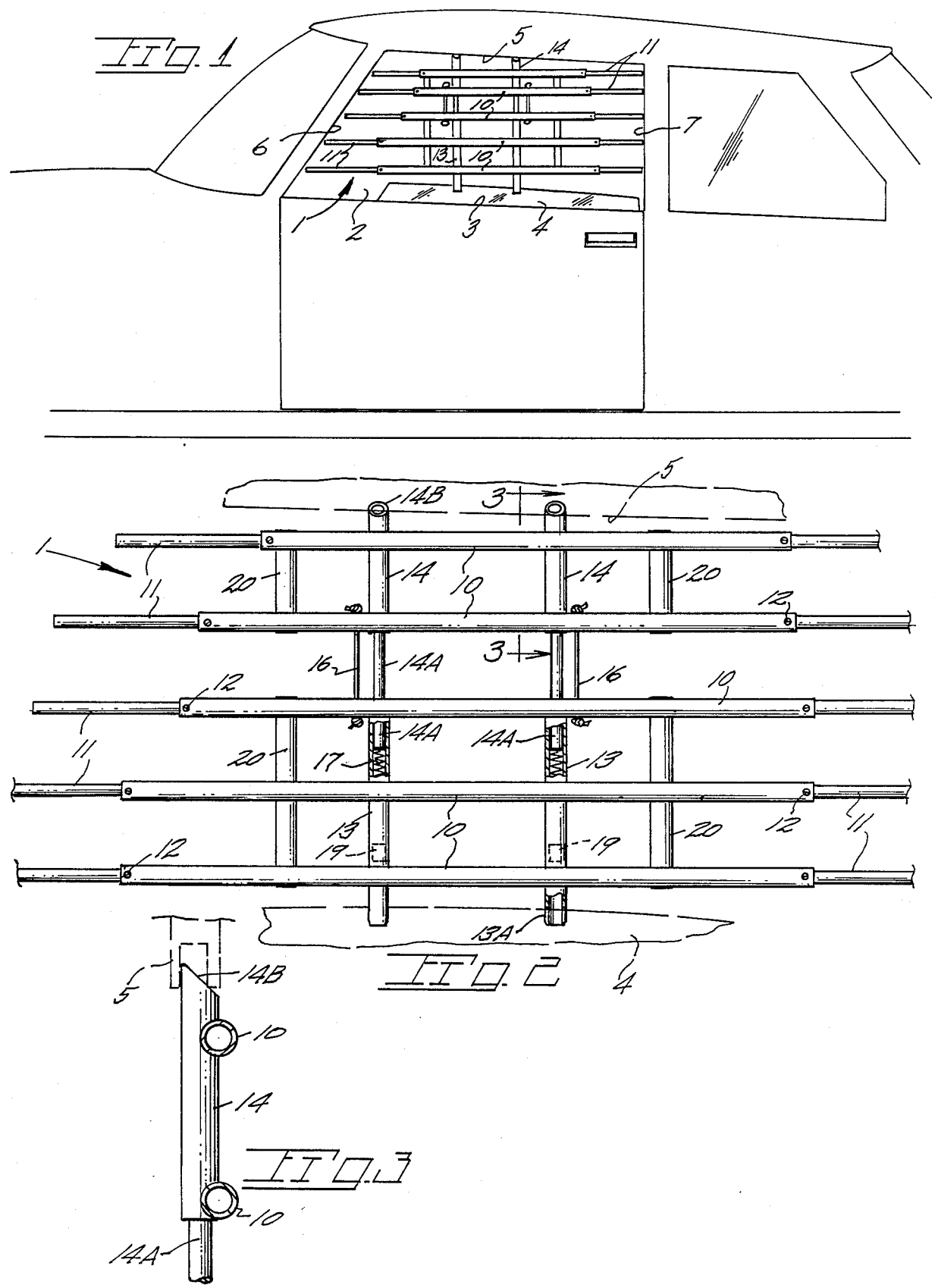

PET BARRIER FOR CAR WINDOW INSTALLATION

BACKGROUND OF THE INVENTION

The present invention pertains generally to devices for installation in a car or truck window to permit the window to be left open for air circulation while providing a barrier to confine a pet left in the vehicle.

Pet owners, at times, must leave a pet in a parked auto which, in warmer climates, can subject the pet to extreme temperatures. Leaving a window open additionally incurs the risk of the pet escaping and invites unauthorized entry of the vehicle. Attempts to solve the problem by the installation of "ventilators" and screens are found in U.S. Pat. Nos. 3,083,630, 3,743,001, 4,398,586 and 4,653,562. While such efforts have provided barriers to pets confined in an auto, the window installed structures are suitable for installation only within a very limited number of window configurations and usually require the user to acquire multiple barriers for two or more vehicles or successively owned vehicles of different makes or models. Such a problem results from window size as well as configuration of the window opening. A particular troublesome installation of a barrier or "ventilator" is in a so-called hardtop automobile body style where the window channels are defined by the auto body as opposed to being defined by the vehicle door. A further problem is that of installation of the earlier devices by the auto owner.

SUMMARY OF THE PRESENT INVENTION

The present invention is embodied in a pet barrier which is readily adaptable to various vehicle window shapes by reason of a multitude of horizontally adjustable members.

The present barrier includes vertically spaced members which are fitted with extendible end segments for endwise abutment with auto structure defining a window opening. The end segments are positionable and fixable in place to accommodate differences in horizontal window dimensions of most all auto and small truck models in current use. Provision is also made for accommodating the range of vertical window dimensions found in such vehicles. Spring biased barrier components are urged into seated engagement with the window channel or resilient weatherstripping defining the window opening. Such spring biased components facilitate convenient installation and removal of the barrier from the window opening.

Important objectives of the present invention include the provision of a pet barrier for installation within virtually all automobile and light truck window openings regardless of size and configuration; the provision of a pet barrier lending itself to convenient sizing by the user and subsequent removal and re-sizing of the barrier for installation of the barrier in other window openings; the provision of a pet barrier having posts shaped at their ends to engage adjacent structure of the vehicle such as window edges and window receiving channels to assure barrier retention; the provision of a pet barrier of lightweight tubular stock providing a barrier of low manufacturing cost and one conveniently installed by the user.

BRIEF DESCRIPTION OF THE DRAWINGS

In the accompanying drawings:

FIG. 1 is a fragmentary side elevational view of an automobile with the present pet barrier in place within a window opening; and FIG. 2 is an elevational view of the pet barrier removed from the automobile and with fragments broken away for purposes of illustration.

FIG. 3 is a view taken at line 3—3 of FIG. 2.

DETAILED DESCRIPTION OF THE PREFERRED EMBODIMENTS

With continuing attention to the drawing wherein applied reference numerals indicate parts similarly hereinafter identified, the reference numeral 1 indicates generally the present barrier installed in place in a vehicle window opening 2.

Window opening 2 is defined by a sill 3 past which moves a window 4. Additional door or automobile body structure constitutes an upper extremity 5 of the window opening as well as front and rear window opening extremities at 6 and 7. In certain automobile body styles, such as hardtops, the forward and rearward extremities as well as the upper extremities of the window opening are embodied in vehicle body structure while in sedans, the window opening is entirely defined by door structure. A wide range of window lengths, heights and shapes exist in the automotive and light truck fields.

With particular attention now to the present pet barrier, the same comprises elongate main horizontal members 10, preferably of tubular construction, and receiving at their ends extensions 11. The extensions shown are telescopic and are secured in place by locking means 12 shown as fasteners carried by the elongate members and engageable with the inserted portion of each extension. Accordingly, the effective length of each elongate member may be affected by axial positioning of the extension into abutment with forward or rearward structure 6 or 7 of the window opening to adapt the barrier to the particular window size and shape.

Connecting the elongate main horizontal members 10 are upright support members 13 which are shaped at their lower ends in a recessed manner to straddle the upper edge of the auto or truck window. Spring biased segments 14 are slidably received within the posts proper and spring biased upwardly by helical springs 15 concealed within the posts. A reduced portion 14A of spring biased segments 14 is telescopically received within posts 13. The uppermost ends of spring biased segments are tapered at 14B to enable seating of same within a window receiving channel or resilient strip which otherwise receives the upper edge of the vehicle window when raised. Limit stops at 16 serve to retain the spring biased segments 14 in engagement with posts 13 and may be heavy duty cord which passes through aligned openings in elongate members 10 and thence knotted. Inserts at 19 support the lower ends of the springs at 17.

Braces at 20 serve to reinforce the horizontal elongate members 13 against vertical displacement.

The barrier is preferably constructed from tubular material with the elongate members 13 being recessed to receive the adhesively attached posts 13 and braces 20.

In use, the auto or truck window is lowered so as to locate its uppermost edge proximate door sill 3 while spring biased segments 14 and the elongate members carried thereby are manually depressed with subsequent release permitting the upper ends 14B of the spring biased segments to seat within the channel defining the upper limit of the window opening. Extensions 11 are thereafter axially positioned into abutment with automobile body or door structure constituting the forward and rearward limits of the window opening and secured by locking means 12. Removal of the barrier is readily accomplished by depressing of the spring biased post segments 14 followed by lifting of the barrier in an inclined manner out of the window opening.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

1. A pet barrier for installation in a vehicle window opening defined by vehicle body or door structure, said barrier including, a multitude of vertically spaced elongate main horizontal members, at least some of said members including multiple telescopic extensions each independently and adjustably carried at the ends of said some of said members for independent horizontal positioning into endwise abutment with vehicle structure, locking means on said main horizontal members and engageable with said telescopic extensions to retain same in place in adjusted endwise abutment with said vehicle structure, and support means including upright posts interconnecting said main horizontal members and engageable with vehicle structure, said posts being of adjustable length and including segments which carry at least one of said horizontal members, said segments being spring biased to urge same into engagement with vehicle structure.

2. The barrier claimed in claim 1 wherein said locking means are fasteners engageable with said extensions.

3. The barrier claimed in claim 1 wherein said posts have tapered ends for inserted reception into a window receiving channel.

4. The barrier claimed in claim 3 wherein said posts have recessed ends adapted to restingly straddle the upper edge of a vehicle window.

* * * * *